United States Patent [19]
Zajaczkowski et al.

[11] Patent Number: 5,981,666
[45] Date of Patent: Nov. 9, 1999

[54] METHOD FOR THE PRODUCTION OF A HIGH PERFORMANCE PRESSURE SENSITIVE ADHESIVE

[75] Inventors: Michael J. Zajaczkowski, Yoe; Bernard Gordon, III, State College, both of Pa.

[73] Assignee: Adhesives Research, Inc., Glen Rock, Pa.

[21] Appl. No.: 08/971,732

[22] Filed: Nov. 17, 1997

Related U.S. Application Data

[63] Continuation of application No. 07/729,162, Jul. 12, 1991, abandoned.

[51] Int. Cl.$^6$ .......................... C08F 226/00; C08F 220/12
[52] U.S. Cl. .......................... 525/296; 525/301; 525/302; 525/308; 525/329.2
[58] Field of Search ...................................... 525/301, 308, 525/302, 296, 329.2

[56] References Cited

U.S. PATENT DOCUMENTS

| | | |
|---|---|---|
| 3,786,116 | 1/1974 | Milkovich et al. . |
| 3,832,423 | 8/1974 | Milkovich et al. . |
| 3,842,146 | 10/1974 | Milkovich et al. . |
| 3,862,077 | 1/1975 | Schulz et al. . |
| 3,879,494 | 4/1975 | Milkovich et al. . |
| 3,928,255 | 12/1975 | Milkovich et al. . |
| 3,989,768 | 11/1976 | Milkovich et al. . |
| 4,085,168 | 4/1978 | Milkovich et al. . |
| 4,551,388 | 11/1985 | Schlademan . |
| 4,554,324 | 11/1985 | Husman et al. .......................... 525/301 |
| 4,656,213 | 4/1987 | Schlademan . |
| 4,693,776 | 9/1987 | Krampe et al. . |
| 4,732,808 | 3/1988 | Krampe et al. . |
| 4,871,812 | 10/1989 | Lucast et al. . |

*Primary Examiner*—Jeffrey C. Mullis

[57] ABSTRACT

A novel high performance pressure sensitive adhesive composition is provided comprised of a phase separated graft copolymer comprised of a polymerized acrylic or methacrylic acid ester backbone having grafted thereon pendant polymeric moieties such as polystyrene or poly-alpha-methylstyrene in an amount of from 1.5 to 2.5 grafts per polymer chain on average.

19 Claims, No Drawings

METHOD FOR THE PRODUCTION OF A HIGH PERFORMANCE PRESSURE SENSITIVE ADHESIVE

This is a continuation of application Ser. No. 07/729,162 filed on Jul. 12, 1991 now abandoned.

BACKGROUND OF THE PRESENT INVENTION

The present invention is directed to a pressure sensitive adhesive composition comprised of a polymerized acrylic or methacrylic acid ester backbone having grafted thereto pendant polymeric moieties.

Polymeric compositions are known which are comprised of backbone polymers having grafted thereto pendant polymeric moieties. The type of backbone polymer and graft polymeric moiety employed varies depending upon the desired characteristics of the end product. See, for example, U.S. Pat. Nos. 3,786,116; 3,832,423; 3,842,146; 3,862,077; 3,879,494; 3,928,255; 3,989,768; 4,085,168; 4,551,388; 4,554,324; 4,656,213; 4,693,776; 4,732,808; and 4,871,812 which disclose various types of such polymers which may or may not exhibit pressure sensitive adhesive properties.

Typical of the type of polymeric compositions disclosed in the above patents are compositions comprised of a backbone polymer such as an acrylic or methacrylic backbone polymer having attached thereto a graft polymer comprised of a polymerizable macromolecular monomer such as styrene or alpha-methylstyrene. See, for example, U.S. Pat. No. 4,554,324, among others, in this regard.

The acrylic pressure sensitive adhesives such as described in U.S. Pat. No. 4,554,324 may be made from an acrylic ester and a polar acrylic monomer. The polar acrylic monomer can be one or a mixture of acrylic acid, acrylamide, acrylonitrile, itaconic acid, etc. The acrylic ester can be any aliphatic ester of acrylic acid. Such monomers are typically polymerized free radically by solution, suspension or emulsion polymerization. The acrylate portion of the copolymer is generally present in a generally high concentration and renders the polymer tacky. The polar monomer increases the ability of the adhesive to bond to a surface.

While such polymeric compositions have been found to have utility as pressure sensitive adhesives, one area that has not heretofore been addressed with much success is providing high performance pressure sensitive adhesives which may be suitable for use in high temperature environments (i.e., environments where the temperature exceeds about 250° F.).

By way of example, the aerospace and automotive industries are experiencing an increased demand for adhesives with the capability to withstand temperature extremes of −200° F. to as high as 400° F. It has been found that typical acrylic pressure sensitive adhesives, while performing satisfactorily at temperatures as low as −45° F., fail at temperatures of about 150–200° F. (and sometimes at lower temperatures) as the adhesive becomes too soft and is unable to retain acceptable adhesive properties. Attempts have been made to enhance the performance of such adhesives by cross-linking procedures.

Presently, silicone pressure sensitive adhesives are known for their high performance characteristics including their ability to perform at temperatures as high as 500° F. However, the range of end uses for such adhesives is much more limited than acrylic pressure sensitive adhesives. Unfortunately, acrylic pressure sensitive adhesives are not able to satisfactorily perform at the same high temperatures as silicone adhesives.

The problems which exist in prior art acrylic adhesive compositions in connection with high temperature stability results from the fact that as the temperature of use exceeds the glass transition or melt temperature of the reinforcing graft or "hard" segment of the polymer composition, both the "hard" segment and the "soft" acrylic polymer backbone tend to flow. Such flow tendency adversely effects the ability of the composition to serve as an adhesive at high temperatures.

OBJECTS AND SUMMARY OF THE PRESENT INVENTION

It is accordingly an object of the present invention to provide a pressure sensitive adhesive composition which exhibits high performance properties.

It is further an object of the present invention to provide a pressure sensitive adhesive composition which retains sufficient adhesive strength at high temperatures.

It is still yet further an object of the present invention to enhance the performance characteristics of an acrylic pressure sensitive adhesive while avoiding the need of cross-linking.

In accordance with the present invention, there is provided a normally tacky phase-separated graft copolymer pressure sensitive adhesive composition comprised of a backbone polymer comprised of copolymerized monomers A and B having a polymeric moiety grafted thereto, wherein (1) monomer A is a monomeric acrylic or methacrylic acid ester of a non-tertiary alcohol, said alcohol having from 1 to 14 carbon atoms with the average number of carbon atoms being in the range of from about 4 to 12, (2) monomer B is a polar monomer which is copolymerizable with said monomer A, and (3) said graft is a polymeric moiety having a Tg greater than 20° C., and wherein said graft is present in said composition in an amount of from 1.5 to 2.5 polymeric moieties per polymeric backbone chain on average.

In accordance with a preferred aspect of the present invention, said graft comprises polystyrene or poly-alpha-methylstyrene present in an amount of 2 polymeric moieties per polymer backbone chain.

DETAILED DESCRIPTION OF THE INVENTION

The pressure sensitive adhesive composition of the present invention is comprised of a "hard" reinforcing graft polymeric moiety attached to or copolymerized with a "soft" backbone polymer to obtain a phase-separated adhesive composition exhibiting high performance properties such as acceptable adhesive strength at elevated temperatures. While compositions are known which are comprised of a "soft" backbone polymer having an attached "hard" reinforcing graft polymer, such prior art compositions fail to exhibit the desired high performance adhesive properties such as high strength in elevated temperature environments.

It has been found, however, that such prior art compositions can be modified to yield a pressure sensitive adhesive composition having the desired high performance properties by focusing upon the type and amount (i.e., 1.5 to 2.5 polymeric graft moieties on average per polymer backbone) of polymer graft present.

Specifically, the adhesive composition comprises a phase separated graft copolymer composition comprised of copolymerized monomers A and B to form a backbone polymer having a polymeric moiety grafted thereto, wherein monomer A is a monomeric acrylic or methacrylic acid ester of a non-tertiary alcohol having from 1 to 14 carbon atoms with the average number of carbon atoms being in the range of about 4 to 12, and monomer B is a polar monomer which is copolymerizable with monomer A.

Exemplary A monomers include but are not limited to esters of acrylic acid or methacrylic acid with non-tertiary alcohols such as 1-butanol, 1-pentanol, 2-pentanol, 3-pentanol, 2-methyl-1-butanol, 1-methyl-1-pentanol, 2-methyl-1-pentanol, 3-methyl-1-pentanol, 2-ethyl-1-butanol, 3,5,5-trimethyl-1-hexanol, 3-heptanol, 2-octanol, 1-decanol, 1-dodecanol, etc. Such monomers are known to those skilled in the art.

Exemplary B monomers include but are not limited to one or more of acrylic acid, methacrylic acid, itaconic acid, acrylamide, methylacrylamide, acrylonitrile, methacrylonitrile, diacetone acrylamide, and 2-carboxyl ethyl esters of acrylic acid.

The A monomer will generally be present in the composition in an amount with the range of from about 50 to 80 percent by weight, based on the total weight of the composition, with any additional monomers employed (such as the B monomer) and the polymeric graft moiety comprising the remaining portion of the composition. Further, the graft polymeric moiety will generally comprise from about 2 to 30 percent by weight of the combined amount of the B and C monomers.

The polymer graft is a polymeric moiety having a Tg greater than 20° C. and is present in an amount of from 1.5 to 2.5 polymeric moieties per polymer backbone on average, and preferably in an amount of 2 polymeric moieties per chain on average.

Advantageously, the resulting pressure sensitive adhesive composition exhibits a shear holding value at 250° F. of at least 72 hours in a shear strength test in which a 1 in$^2$ section of adhesive film is laminated to a stainless steel panel with a PSTC roller while suspending a 500 gram weight from the test film.

The composition of the present invention successfully overcomes the deficiencies of prior art adhesive compositions by providing for the presence of graft polymeric moieties of relatively high glass transition or melt temperatures while also providing for the presence of graft polymer chains in an amount sufficient to provide a reinforcing function which inhibits or restricts flow of the polymer backbone at elevated temperatures.

The composition of the present invention is characterized as being "phase-separated". That is, the backbone of the copolymer and the attached graft are incompatible and thus do not mix together to form a homogeneous phase. Instead, the copolymer backbone forms a continuous phase within which is dispersed the attached graft phase. The dispersed graft discontinuous phase thus acts to mechanically reinforce the continuous phase, thus inhibiting the flow of the continuous phase at an elevated temperature.

The polymer graft may be attached to the polymer backbone by conventional techniques such as (1) copolymerization with the respective monomers of the backbone polymer or (2) attachment to a preformed backbone polymer via a suitable functional group subsequent to formation of same by copolymerization of monomers A and B.

With regard to technique (1) which comprises the preferred technique, the adhesive composition of the present invention may be formed from copolymerized monomers A, B and C, wherein (1) monomer A is a monomeric acrylic or methacrylic acid ester of a non-tertiary alcohol, said alcohol having from 1 to 14 carbon atoms with the average number of carbon atoms being in the range of about 4 to 12, (2) monomer B is a polar monomer copolymerizable with said monomer A, the B monomer being present in an amount of up to about 12% by weight of the total weight of all monomers, and (3) monomer C has the general formula X-Z wherein X is a group copolymerizable with said monomers A and B (preferably a vinyl group), and Z is a polymeric graft moiety having a Tg greater than 20° C., said moiety Z being essentially unreactive under copolymerization conditions, wherein said group X of said monomer C and said monomers A and B are copolymerized to form a polymeric backbone chain having pendant therefrom polymeric moiety Z, and wherein said polymeric moiety Z is present in said composition in an amount of from 1.5 to 2.5 polymeric moieties on average per polymeric backbone chain.

A graft polymeric moiety may be prepared as a macromer and copolymerized with one or more A and B monomers which form the backbone polymer such as acrylic acid, acrylamide, methacrylic acid, methacrylamide and alkyl acrylates where the alkyl groups contain from 1 to 14 carbon atoms (e.g., methyl, ethyl, propyl, isopropyl, butyl, amyl, hexyl, 2-ethylhexyl and other octyl, nonyl and decyl acrylates). See, for instance, the disclosure of U.S. Pat. No. 3,786,116, incorporated by reference in its entirety, in this regard.

Typical copolymerization techniques include but are not limited to conventional free radical initiated copolymerization techniques in the presence of a solvent. Suitable copolymerization temperatures range from about 20° C. to 150° C. for periods of time of from 2 to 24 hours until the desired degree of conversion occurs.

Upon completion of the polymerization process, the solvent is removed and a tacky acrylate copolymer results having an acceptable balance of tack and shear adhesive properties at high temperatures.

Depending upon the properties imparted to the backbone polymer as a result of the molecular weight of the particular graft employed, the resulting adhesive may need to be used in solution or emulsion form rather than as a melt adhesive. That is, if the molecular weight of the graft is sufficiently high, the resultant adhesive may be applied to a backing material or substrate in emulsion or solution form, with the water or solvent being removed upon application to the substrate.

With regard to the polymeric graft moiety portion of the adhesive composition, U.S. Pat. Nos. 3,786,116; 3,842,057; 3,842,058; 3,842,059; 3,862,098; 3,862,101, 3,862,102 and 4,554,324 disclose polymerizable macromers which are suitable for use as graft moieties on a backbone polymer as defined.

Preferably, the polymeric moiety Z is formed from a vinyl aromatic monomer such as styrene, alpha-methylstyrene, indene and p-tert-butylstyrene. However, the polymeric moiety Z may also be formed from vinyl toluene, acenaphthalene, acrylonitrile and methacrylonitrile, organic isocyanates including lower alkyl, phenyl, lower alkyl phenyl and halophenyl isocyanates, organic diisocyanates including lower alkylene, phenylene, and tolylene diisocyanates, lower alkyl and allyl acrylates and methacrylates, including methyl, t-butyl acrylates, and methacrylates; lower olefins, such as ethylene, propylene, butylene, isobutylene, pentene, hexene, etc.; vinyl esters of aliphatic carboxylic acids such as vinyl acetate, vinyl propionate, vinyl octoate, vinyl oleate, vinyl stearate, vinyl benzoate, vinyl lower alkyl ethers; conjugated dienes such as isoprene and butadiene, 2-oxazolines such as 2-ethyl-2-oxazoline, and vinyl unsaturated amides such as acrylamide, methylacrylamide, N,N-di(lower alkyl) acrylamides such as N,N-dimethylacrylamide.

The selection of the specific polymerizable monomer for the polymer graft is not critical, since as the above listing suggests, a wide variety of monomers (and the resulting polymeric moieties) can be used with success as a polymeric graft in the claimed composition.

A variety of functional groups may be employed to attach the graft Z to the polymer backbone.

Exemplary functional groups include but are not limited to

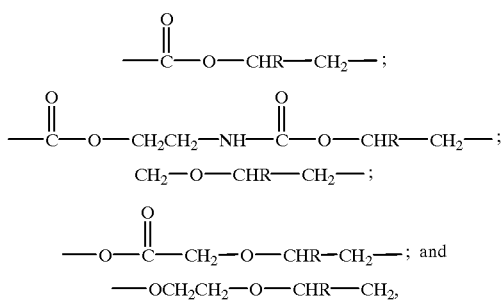

where R is a hydrogen atom or a lower alkyl group.

The molecular weight of the graft polymeric moiety must be sufficient to result in the formation of a "phase-separated" graft copolymer composition. Generally the molecular weight of the graft polymeric moiety will be within the range of from 2,000 to 60,000.

Prior art polymeric compositions are known which are similar in composition to the composition of the present invention but which may or may not exhibit pressure sensitive adhesive properties and which do not exhibit the desired adhesive properties at elevated temperatures.

For instance, U.S. Pat. No. 4,554,324 discloses acrylate copolymer pressure sensitive adhesive compositions comprised of an acrylic polymer backbone with a polystyrene or poly-alpha-methylstyrene polymer grafted thereon.

U.S. Pat. No. 4,554,324 provides that the macromer possess a molecular weight in the range from 2,000 to 30,000. Such molecular weight restrictions are presumably employed to enable the disclosed pressure sensitive adhesive to be melt processed, since the presence of a polymer graft of greater molecular weight would necessitate the need to use more expensive and complicated solution processing techniques.

With regard to the amount of polymer graft present, U.S. Pat. No. 4,554,324 merely teaches that the graft polymer is present within disclosed weight percent ranges. Specifically, the patent states at column 4, lines 30–38 that the moiety C is present in an amount within the range of 1–30% by weight of all monomers present in the composition. The patent further states at column 6, lines 46–54 that the presence of excessive amounts of moiety C in the composition will "over-reinforce" the resultant copolymer, thus decreasing adhesive tack and rendering the composition more "film-like" than "adhesive-like".

U.S. Pat. No. 3,786,116 similarly discloses chemically-joined, phase separated thermoplastic graft copolymers comprised of a backbone polymer having pendent polymer graft moieties. Example 26 of the patent discloses a graft copolymer of poly-alpha-methylstyrene terminated with vinyl chloroacetate and butyl acrylate. The poly-alpha-methylstyrene moiety is stated to have a molecular weight of 12,600.

The composition of Example 26 is found to exhibit insufficient plasticity and shear properties to enable the composition to serve as a pressure sensitive adhesive.

In contrast to the teachings of the prior art regarding the type and the amount of polymer graft employed in the composition, it has been surprisingly found that the use of a polymer graft having specific properties and which is present in an amount of between 1.5 to 2.5 polymeric moieties per polymer backbone on average results in a composition which exhibits high performance properties at elevated temperatures while desirably retaining those adhesive properties normally exhibited only at ambient temperatures.

For example, polymer grafts having a molecular weight of at least 30,000 and having a Tg of at least 30° C. (e.g., polystyrene) or which are based on poly-alpha-methylstyrene have been found to enable the desired high temperature properties to be attained if present in the adhesive composition in an amount of about 1.5 to 2.5 polymeric moieties per polymeric backbone chain on average (i.e., 1.5–2.5 mole % on average).

The presence of the polymer graft on the backbone polymer in the manner stated has been found to result in a composition in which the respective polymeric backbone chains remain bound to one another at temperatures above the Tg of the backbone polymer. That is, the respective separate phases of the backbone polymers and the graft polymeric moieties are caused to be bound together without disadvantageously affecting the adhesive characteristics of the composition.

Further advantages may be attained by employing a graft polymer of sufficient molecular weight to further enhance the temperature properties of the adhesive composition.

Molecular weight considerations notwithstanding, it is found that the polymeric network which comprises the adhesive composition can be held together by the presence of from about 1.5 to about 2.5, and preferably about 2, polymeric grafts on average on the backbone polymer. Thus, the phase separated domains present in the composition become interconnected to an extent sufficient to result in an enhanced resistance to flow at elevated temperatures.

Thus, while the prior art such as U.S. Pat. No. 4,554,324 provides for the presence of polymerized graft macromers on an acrylic polymer backbone, the prior art fails to recognize that a critical result to achieve is not the weight percent of macromers present in the composition but is instead the number of chains of the polymeric graft moiety present in the composition (by way of attachment to the polymer backbone).

The distinction between mole percent and weight percent can be dramatic with regard to the amount of graft moiety present in the composition depending upon the molecular weight of the graft. That is, while the presence of from 1.5 to 2.5 grafts per polymer backbone chain on average has been found to enable the objects of the present invention to be attained, the weight percent of graft which is necessary to achieve this result can vary over a wide range depending upon the molecular weight of the graft employed.

The following confirms by way of example the distinction that exists between weight percent and mole percent with regard to the amount of graft present on the backbone polymer of an adhesive composition having a weight average molecular weight of 400,000. For purposes of illustration, the primary monomer is isooctylacrylate with a molecular weight of 184 grams/mole. Again, the goal is to provide an average of 2 grafts per chain, using for purposes of calculation a graft of either an average molecular weight of 50,000 (high molecular weight) or 10,000 (low molecular weight). Each 100 kilogram sample of polymer contains 0.25 moles of polymer. As a result, each 100 kilogram sample of polymer requires the addition of 0.5 moles of graft to yield 2 grafts/polymer chain on average.

0.5 moles of the high molecular weight sample of the graft corresponds to 25 kilograms, while 0.5 moles of the low molecular weight sample of the graft corresponds to 5 kilograms.

The resulting composition thus comprises 25 weight percent of the high molecular weight graft or 5 weight percent of the low molecular weight graft, with 2 graft chains per polymer backbone on average being provided in each instance.

Indeed, the high and low molecular weight grafts would be present in approximately the same mole percentages (i.e., 0.12 and 0.10 mole percent, respectively).

It is thus clear that the reliance of the prior art upon the percent by weight of graft present is alone of little value in determining the number of grafts present on the polymer backbone chain. Nor is the percent by weight of graft directly relevant to the attainment of the objects of the present invention (i.e., providing a pressure sensitive adhesive which exhibits satisfactory high performance characteristics) if the desired number of grafts per polymer backbone on average do not also result.

In order to demonstrate the advantageous properties of the adhesive compositions of the present invention, various polymeric adhesive compositions were prepared having the compositions described in the following Examples 1–8:

EXAMPLE 1

A polyacrylate polymer having a polystyrene graft having a molecular weight of 13,000 is prepared by the following method. In a glass 1 liter reaction vessel the following charge stock was incrementally polymerized under a nitrogen atmosphere at 73° C. over 5½ hours with agitation to a viscosity of 4300 centipoise:

| | |
|---|---|
| Isooctyl Acrylate (A monomer) | 134 grams |
| Acrylic Acid (B monomer) | 3 grams |
| Qm-824 (B monomer) | 25 grams |
| Vinyl Acetate (B monomer) | 20 grams |
| Acrylamide (B monomer) | 3.15 grams |
| Diacetone Acrylamide (B monomer) | 3.15 grams |
| Polystyrene Methacrylate Macromer (Graft) | 8.58 grams |
| Benzoyl Peroxide (Initiator) | .62 grams |
| Ethyl Acetate (Solvent) | 367 grams |

Note: Qm-824 is a Rohm & Haas product identified as β-Carboxyethyl Acrylate

EXAMPLE 2

A polyacrylate polymer having a polystyrene graft having a molecular weight of 20,000 is prepared by the method of Example 1 from the following charge stock:

| | |
|---|---|
| Isooctyl Acrylate | 134 grams |
| Acrylic Acid | 3 grams |
| Qm-824 | 25 grams |
| Vinyl Acetate | 20 grams |
| Acrylamide | 3.15 grams |
| Diacetone Acrylamide | 3.15 grams |
| Polystyrene Methacrylate Macromer | 14.39 grams |
| Benzoyl Peroxide | .64 grams |
| Ethyl Acetate | 378 grams |

EXAMPLE 3

A polyacrylate polymer solution having a viscosity of 2,200 cps and having a polystyrene graft having a molecular weight of 30,000 is prepared by the method of Example 1 from the following charge stock:

| | |
|---|---|
| Isooctyl Acrylate | 134 grams |
| Acrylic Acid | 3 grams |
| Qm-824 | 25 grams |
| Vinyl Acetate | 20 grams |
| Acrylamide | 3.15 grams |
| Diacetone Acrylamide | 3.15 grams |
| Polystyrene Methacrylate Macromer | 19.8 grams |
| Benzoyl Peroxide | .65 grams |
| Ethyl Acetate | 388 grams |

EXAMPLE 4

A polyacrylate polymer solution having a viscosity of 200,000 cp and having a polystyrene graft having a molecular weight of 47,000 is prepared by the method of Example 1 from the following charge stock:

| | |
|---|---|
| Isooctyl Acrylate | 134 grams |
| Acrylic Acid | 3 grams |
| Qm-824 | 25 grams |
| Vinyl Acetate | 20 grams |
| Acrylamide | 3.15 grams |
| Diacetone Acrylamide | 3.15 grams |
| Polystyrene Methacrylate Macromer | 30 grams |
| Benzoyl Peroxide | .64 grams |
| Ethyl Acetate | 372 grams |

EXAMPLE 5

A polyacrylate polymer solution having a viscosity of 4,700 cps after dilution with 150 grams of ethyl acetate and having a polystyrene graft having a molecular weight of 54,000 is prepared by the method of Example 1 from the following charge stock:

| | |
|---|---|
| Isooctyl Acrylate | 134 grams |
| Acrylic Acid | 3 grams |
| Qm-824 | 25 grams |
| Vinyl Acetate | 20 grams |
| Acrylamide | 3.15 grams |
| Diacetone Acrylamide | 3.15 grams |
| Polystyrene Methacrylate Macromer | 35.64 grams |
| Benzoyl Peroxide | .62 grams |
| Ethyl Acetate | 368 grams |

EXAMPLE 6

A polyacrylate polymer solution having a viscosity of 11,600 cps and having a poly-alpha-methylstyrene graft having a molecular weight of 6,600 is prepared by the method of Example 1 from the following charge stock:

| | |
|---|---|
| Isooctyl Acrylate | 66.4 grams |
| Acrylic Acid | 1.48 grams |
| Qm-824 | 12.34 grams |
| Vinyl Acetate | 9.87 grams |
| Acrylamide | 1.55 grams |
| Diacetone Acrylamide | 1.55 grams |
| Poly Alpha-Methyl Styrene Macromer | 2.62 grams |
| Benzoyl Peroxide | .31 grams |
| Ethyl Acetate | 181.4 grams |

EXAMPLE 7

A polyacrylate polymer solution having a viscosity of 18,000 cps and having a poly-alpha-methylstyrene graft having a molecular weight of 12,100 is prepared by the method of Example 1 from the following charge stock:

| | |
|---|---|
| Isooctyl Acrylate | 51.1 grams |
| Acrylic Acid | 1.14 grams |
| Qm-824 | 9.5 grams |
| Vinyl Acetate | 7.6 grams |
| Acrylamide | 1.2 grams |
| Diacetone Acrylamide | 1.2 grams |
| Poly Alpha-Methyl Styrene Macromer | 3.26 grams |
| Benzoyl Peroxide | .24 grams |
| Ethyl Acetate | 139.7 grams |

EXAMPLE 8

A polyacrylate polymer having a viscosity of 1,750 cps and having a poly-alpha-methylstyrene graft having a molecular weight of 30,000 is prepared by the method of Example 1 from the following charge stock:

| | |
|---|---|
| Isooctyl Acrylate | 53.8 grams |
| Acrylic Acid | 1.2 grams |
| Am-824 | 10 grams |
| Vinyl Acetate | 8 grams |
| Acrylamide | 1.26 grams |
| Diacetone Acrylamide | 1.26 grams |
| Poly Alpha-Methyl Styrene Macromer | 7.92 grams |
| Benzoyl Peroxide | .26 grams |
| Ethyl Acetate | 88.6 grams |
| Toluene | 59 grams |

The following Table I demonstrates the effect of the molecular weight of the graft on the performance characteristics of various pressure sensitive adhesive compositions of Examples 1–6 where the graft is present in an amount of two graft chains per polymer backbone chain on average.

TABLE I

EFFECT OF MOLECULAR WEIGHT OF POLYSTYRENE GRAFT

| | Graft Molecular Weight | | | | |
|---|---|---|---|---|---|
| | 13,000 | 20,000 | 30,000 | 47,000 | 54,000 |
| 5 Min Peel (oz) | 86 | 64 | 71 | 50 | 93 |
| 5 lb. Shear (hrs) | >336 | >336 | >336 | >336 | >336 |
| Zoom Shear (min) | 4 | 5 | 15 | 8 | 7 |
| Zoom Shear (Temp, °F.) | 245 | 260 | 500 | 302* | 292** |
| Hot Shear (185° F.) | 10 min | >72 hrs | >72 hrs | >72 hrs | >72 hrs |
| Hot Shear (200° F.) | — | <15 min | >72 hrs | >72 hrs | >72 hrs |
| Hot Shear (250° F.) | — | — | >72 hrs | >72 hrs | >72 hrs |
| Hot Shear (300° F.) | — | — | >72 hrs | — | — |

Note: 5 minute peel: 180 degree peel of the adhesive coated on a polyester backing and bonded to stainless steel.
5 lb. shear: 5 lb. dead load shear test of the adhesive coated on 2 mil. dead soft aluminum and bonded to stainless steel.
Zoom shear: 500 gram dead load shear in which temperature is increased rapidly over time until failure occurs.
Hot shear: 500 gram dead load shear at constant elevated temperature.
*Slippage at 255–265° F.
**Slippage at 269° F.

The data of Table I indicates that the use of a polystyrene graft which is present in an amount of 2 polymeric moieties per polymer backbone chain on average exhibits advantageous cohesive and adhesive strength.

Further, increasing the molecular weight of the polystyrene graft to at least 30,000 enables the resulting pressure sensitive adhesive composition to satisfactorily perform at relatively high temperatures as evidenced by the hot shear tests. That is, a polystyrene graft having a molecular weight of at least 30,000 exhibits satisfactory hot shear strength at temperatures of at least 250° F. By contrast, employing a polystyrene graft having a molecular weight of 13,000 or 20,000 results in a pressure sensitive adhesive which, while otherwise acceptable, exhibits less desirable hot shear values at temperatures as low as 185 and 200° F., respectively.

Table II below summarizes similar tests conducted with adhesive compositions of the present invention of Examples 6–8 including poly-alpha-methylstyrene grafts in an amount of 2 chains per polymer backbone chain on average:

TABLE II

EFFECT OF MOLECULAR WEIGHT OF POLY-ALPHA-METHYLSTYRENE GRAFT

| | Graft Molecular Weight | | |
|---|---|---|---|
| | 6600 | 12,100 | 30,000 |
| 5 Min Peel (oz) | 57 | 54 | 70 |
| 5 lb. Shear (hrs) | 168 | >336 | >336 |
| Zoom Shear (min) | 7 | 15 | 12 |
| Zoom Shear (Temp, °F.) | 290 | 444* | 379 |
| Hot Shear (185° F.) | >72 hrs | >72 hrs | >72 hrs |
| Hot Shear (200° F.) | >72 hrs | >72 hrs | >72 hrs |
| Hot Shear (250° F.) | >72 hrs | >72 hrs | >72 hrs |
| Hot Shear (300° F.) | ** | >72 hrs | >72 hrs |

TABLE II-continued

EFFECT OF MOLECULAR WEIGHT OF POLY-ALPHA-METHYLSTYRENE GRAFT

| | Graft Molecular Weight | | |
|---|---|---|---|
| | 6600 | 12,100 | 30,000 |

Note: 5 minute peel: 180 degree peel of the adhesive coated on a polyester backing and bonded to stainless steel.
5 lb. shear: 5 lb. dead load shear test of the adhesive coated on 2 mil. dead soft aluminum and bonded to stainless steel.
Zoom shear: 500 gram dead load shear in which temperature is increased rapidly over time until failure occurs.
Hot shear: 500 gram dead load shear at constant elevated temperature.
*Slippage at 312° F.
**Failure at 290° F.

In contrast to the polystyrene graft, the poly-alpha-methylstyrene graft enables the pressure sensitive adhesive to exhibit high temperature stability at relatively low molecular weights. However, particularly advantageous results are achieved at molecular weights of at least 12,000.

In order to demonstrate the need for 1.5 to 2.5 graft chains on average to be present on the polymer backbone chain, the following tests were conducted and the results summarized in Table III.

Comparative Examples A and B are exemplary pressure sensitive adhesive compositions whose polymer chains on average contain either 1 polystyrene graft per acrylate polymer backbone chain on average (Comparative Example A) or 3 polystyrene grafts per acrylate polymer backbone chain on average (Comparative Example B).

The undergrafted (Comparative Example A) and overgrafted (Comparative Example B) samples were prepared from the following charge stocks:

| | Comparative Example A | Comparative Example B |
|---|---|---|
| Isooctyl Acrylate | 134 grams | 134 grams |
| Acrylic Acid | 3 | 3 |
| Qm-824 | 25 | 25 |
| Vinyl Acetate | 20 | 20 |
| Acrylamide | 3.15 | 3.15 |
| Diacetone Acrylamide | 3.15 | 3.15 |
| Polystyrene Methacrylate macromer (MW = 13,000) | 4.58 | 13.0 |

The compositions of Example 1 and Comparative Examples A and B were evaluated for adhesive performance, with the results of such evaluations being summarized in Table III below:

TABLE III

EFFECT OF NUMBER OF GRAFT CHAINS ON POLYMER BACKBONE

| | Invention Example 1 | Comparative Example A | Comparative Example B |
|---|---|---|---|
| 5 Min Peel (oz) | 86 | 81 | 73 |
| 5 lb. Shear (hr) | >336 | 48 | 72 |
| Plasticity | 3.38 | 2.77 | 4.16 |
| Grafts/Backbone Chain on Average | 2 | 1 | 3 |

The 5 lb. shear data of Table III demonstrates that a polymer composition having either 1 graft per polymer chain on average (Comparative Example A) or 3 grafts per polymer chain on average (Comparative Example B) exhibits less than acceptable adhesive properties in comparison to the composition of Sample 1 which contains two grafts per polymer chain on average.

Table III demonstrates the dramatic change that occurs when two grafts per polymer chain on average are present on the polymer backbone in comparison to those instances where either 1 or 3 grafts on average are present.

In essence, the pressure sensitive adhesive compositions of Comparative Samples A and B which exhibit adhesive properties on a relatively "short term" or "transient" basis (<72 hours) under the test conditions employed are transformed to a pressure sensitive adhesive composition which exhibits long term or more permanent adhesive properties (>336 hours) merely by modifying the number of grafts on the polymer backbone chain. Such a result is clearly unexpected and provides advantages heretofore not achieved by the prior art.

The following Table IV confirms that the composition of the present invention may be formed by blending a plurality of backbone polymer compositions together having a graft copolymer present in an amount outside of the range of 1.5 to 2.5 polymeric moieties per backbone polymer on average whereby the resulting blend contains from 1.5 to 2.5 polymeric moieties per backbone chain on average.

Examples 9, 10 and 11 were prepared comprising pressure sensitive adhesive compositions of differing weight ratio blends of the compositions of Comparative Examples A and B using the weight ratios of 25:75, 50:50 and 75:25, respectively, to yield compositions having 1.5, 2.0 and 2.5 grafts per polymer backbone on average, respectively.

TABLE IV

EFFECT OF NUMBER OF GRAFT CHAINS ON POLYMER BACKBONE BLEND COMPOSITIONS

| | Invention Example 9 | Invention Example 10 | Invention Example 11 |
|---|---|---|---|
| 5 Min. Peel (oz) | 74 | 70 | 76 |
| 5 Lb. Shear (hr) | >336 | >336 | >336 |
| Plasticity | 2.84 | 3.75 | 4.01 |
| Grafts/Backbone Chain on Average | 1.5 | 2.0 | 2.5 |

The results of Table IV are confirmed by further experimentation wherein an acrylic tackifier graft polymer is admixed with an adhesive composition having one graft per backbone chain on average. The admixture of the two results in a polymer composition having on average 2 grafts per backbone chain. While the tackifier and the adhesive each separately exhibit inadequate shear strength (<2 and <8 hours, respectively) the resultant blend exhibits a highly satisfactory shear strength value of >336 hours.

It should be apparent from the above discussion that the adhesive composition of the present invention may be formed by the preparation of a phase separated acrylic graft copolymer having the requisite number of grafts per polymer chain or, alternatively, by the physical blending of multiple phase-separated acrylic graft copolymer compositions to yield a blend which contains on average the desired number of grafts per polymer backbone.

As discussed above, the composition of the present invention has particular utility as a pressure sensitive adhesive. As such, the composition may be employed alone or in combination with a suitable backing material in a manner known to those skilled in the art.

For instance, exemplary backing materials include but are not limmited to flexible or inflexible backing materials conventionally employed in the area of pressure sensitive adhesives such as creped paper, kraft paper, fabrics (knits, non-wovens, wovens), foil and synthetic polymer films such as polyethylene, polypropylene, polyvinyl chloride, poly (ethylene terephthalate) and cellulose acetate, as well as glass, ceramics, metallized polymeric films and other compatible sheet materials.

Such materials may be coated in any conventional manner with the adhesive composition of the present invention, such as by roll coating, spray coating, extrusion coating, co-extrusion coating, hot melt coating by use of conventional coating devices. When appropriate, the composition of the present invention may be applied as a solution and the solvent subsequently removed to leave a tacky adhesive residue on the backing material.

The coated backing material may take many forms, such as tapes, patches, strips, etc., with the choice and form of backing material being ultimately determined by the end use contemplated.

What is claimed is:

1. A method for the production of a high performance pressure sensitive adhesive composition comprising the steps of:
   (1) providing a first graft copolymer comprised of a backbone polymer having polymeric moieties grafted thereto which copolymer exhibits pressure sensitive adhesive properties, and wherein the polymeric graft moieties are present in said first graft copolymer in an amount less than 1.5 polymeric moieties per polymeric backbone chain on average;
   (2) providing a second graft copolymer comprised of a backbone polymer having polymeric moieties grafted thereto which copolymer exhibits pressure sensitive adhesive properties, and wherein the polymeric graft moieties are present in said second graft copolymer in an amount greater than 2.5 polymeric moieties per polymeric backbone chain on average; and
   (3) blending said first and second graft copolymers in an amount effective to yield a blended graft copolymer composition wherein the polymeric graft moieties are present in said blended composition in an amount ranging from 1.5 to 2.5 polymeric graft moieties per polymeric backbone chain on average, wherein said first and second graft copolymers comprise copolymerized monomers A and B having a polymeric moiety grafted thereto, wherein said monomer A is a monomeric (meth)acrylic acid ester of a non-tertiary alcohol, said alcohol having from 1 to 14 carbon atoms with the average number of carbon atoms being in the range of from about 4 to 12, monomer B is a polar monomer which is copolymerizable with said monomer A, and said graft is a polymeric moiety having a Tg greater than 20° C.

2. The method of claim 1 wherein said graft in said first graft copolymer is a polymerized monoalkenyl-substituted aromatic hydrocarbon.

3. The method of claim 2 wherein said polymerized monoalkenyl-substituted aromatic hydrocarbon comprises polystyrene.

4. The method of claim 3 wherein the molecular weight of said graft is in the range of from about 30,000 to 60,000.

5. The method of claim 2 wherein said graft of said first graft copolymer comprises poly-alpha-methylstyrene.

6. The method of claim 5 wherein said poly-alpha-methylstyrene has a molecular weight of at least 12,000.

7. The method of claim 1 wherein the molecular weight of said graft in said first graft copolymer is in the range of from 30,000 to 60,000 and the Tg of said graft polymeric moiety is at least 30° C.

8. The method of claim 1 wherein said graft in said second graft copolymer is a polymerized monoalkenyl-substituted aromatic hydrocarbon.

9. The method of claim 8 wherein said polymerized monoalkenyl-substituted aromatic hydrocarbon comprises polystyrene.

10. The method of claim 9 wherein said graft of said first graft copolymer comprises poly-alpha-methylstyrene.

11. The method of claim 10 wherein said poly-alpha-methylstyrene has a molecular weight of at least 12,000.

12. The method of claim 9 wherein the molecular weight of said graft is in the range of from about 30,000 to 60,000.

13. The method of claim 1 wherein the molecular weight of said graft in said second graft copolymer is in the range of from 30,000 to 60,000 and the Tg of said graft polymeric moiety is at least 30° C.

14. The method of claim 1 wherein said graft is present in said blended composition in an amount of about 2 polymeric moieties per polymer backbone chain on average.

15. The method of claim 1 wherein said A monomer of said second graft copolymer comprises an ester of (meth) acrylic acid with a non-tertiary alcohol selected from the group consisting of 1-butanol, 1-pentanol, 2-pentanol, 3-pentanol, 2-methyl-1-butanol, 1-methyl-1-pentanol, 2-methyl-1-pentanol, 3-methyl-1-pentanol, 2-ethyl-1-butanol, 3,5,5-trimethyl-1-hexanol, 3-heptanol, 2-octanol, 1-decanol and 1-dodecanol.

16. The method of claim 1 wherein said B monomer of said first and second graft copolymers is selected from the group consisting of acrylic acid, methacrylic acid, itaconic acid, acrylamide, methacrylamide, acrylonitrile, methacrylonitrile, diacetone acrylamide and 2-carboxyl ethyl esters of acrylic acid.

17. The method of claim 1 wherein said first graft copolymer comprises from about 50 to 80 percent by weight of said A monomer.

18. The method of claim 1 wherein said second graft copolymer comprises from about 50 to 80 percent by weight of said A monomer.

19. The method of claim 1 wherein said A monomer of said first graft copolymer comprises an ester of (meth) acrylic acid with a non-tertiary alcohol selected from the group consisting of 1-butanol, 1-pentanol, 2-pentanol, 3-pentanol, 2-methyl-1-butanol, 1-methyl-1-pentanol, 2-methyl-1-pentanol, 3-methyl-1-pentanol, 2-ethyl-1-butanol, 3,5,5-trimethyl-1-hexanol, 3-heptanol, 2-octanol, 1-decanol and 1-dodecanol.

* * * * *